Aug. 29, 1961  G. BILLURIS ET AL  2,997,874
METHOD AND APPARATUS FOR DETERMINING THE
SOLUTE CONTENT OF A SOLUTION
Filed March 28, 1956  2 Sheets-Sheet 1
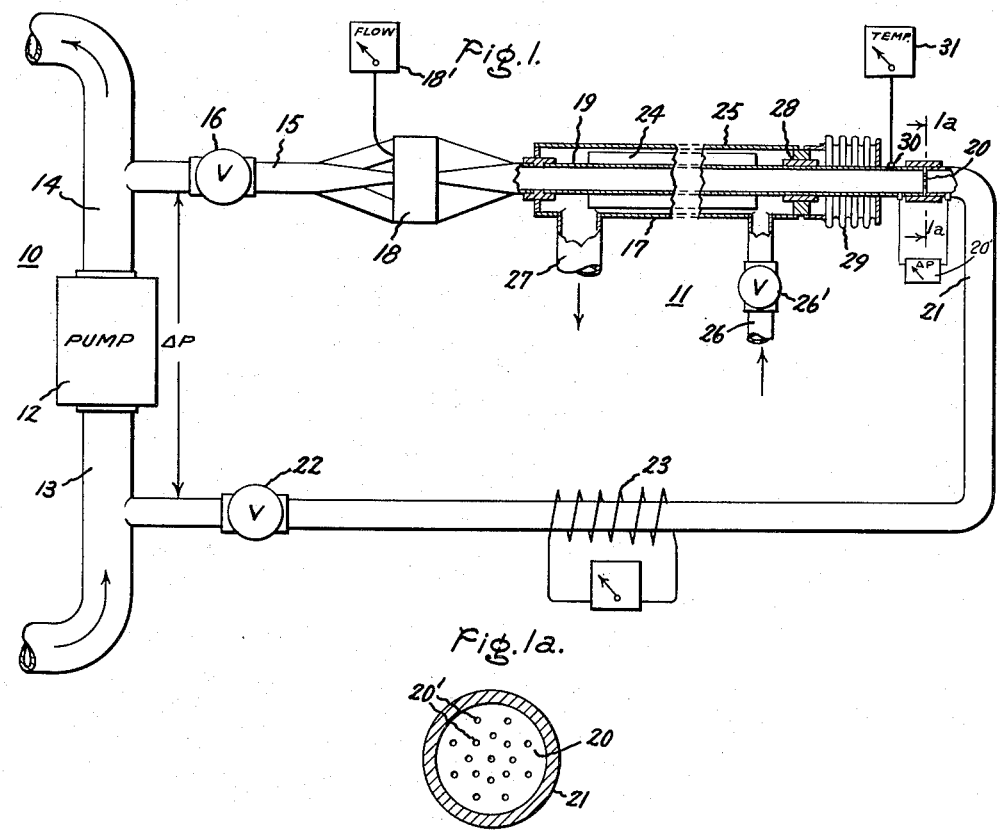
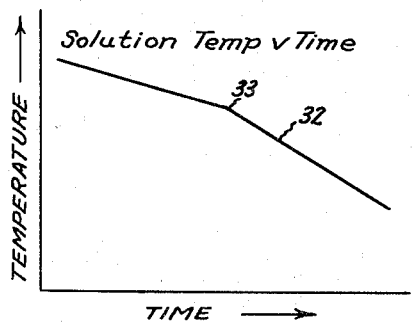
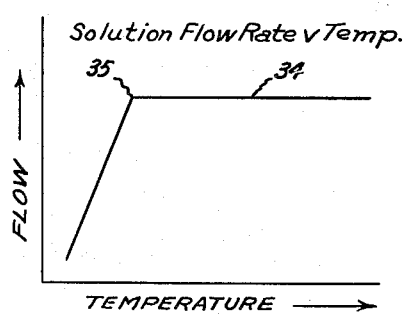
Inventors:
George Billuris,
Bertram G. Voorhees,
by Leonard B. C. Mackey
Their Attorney.

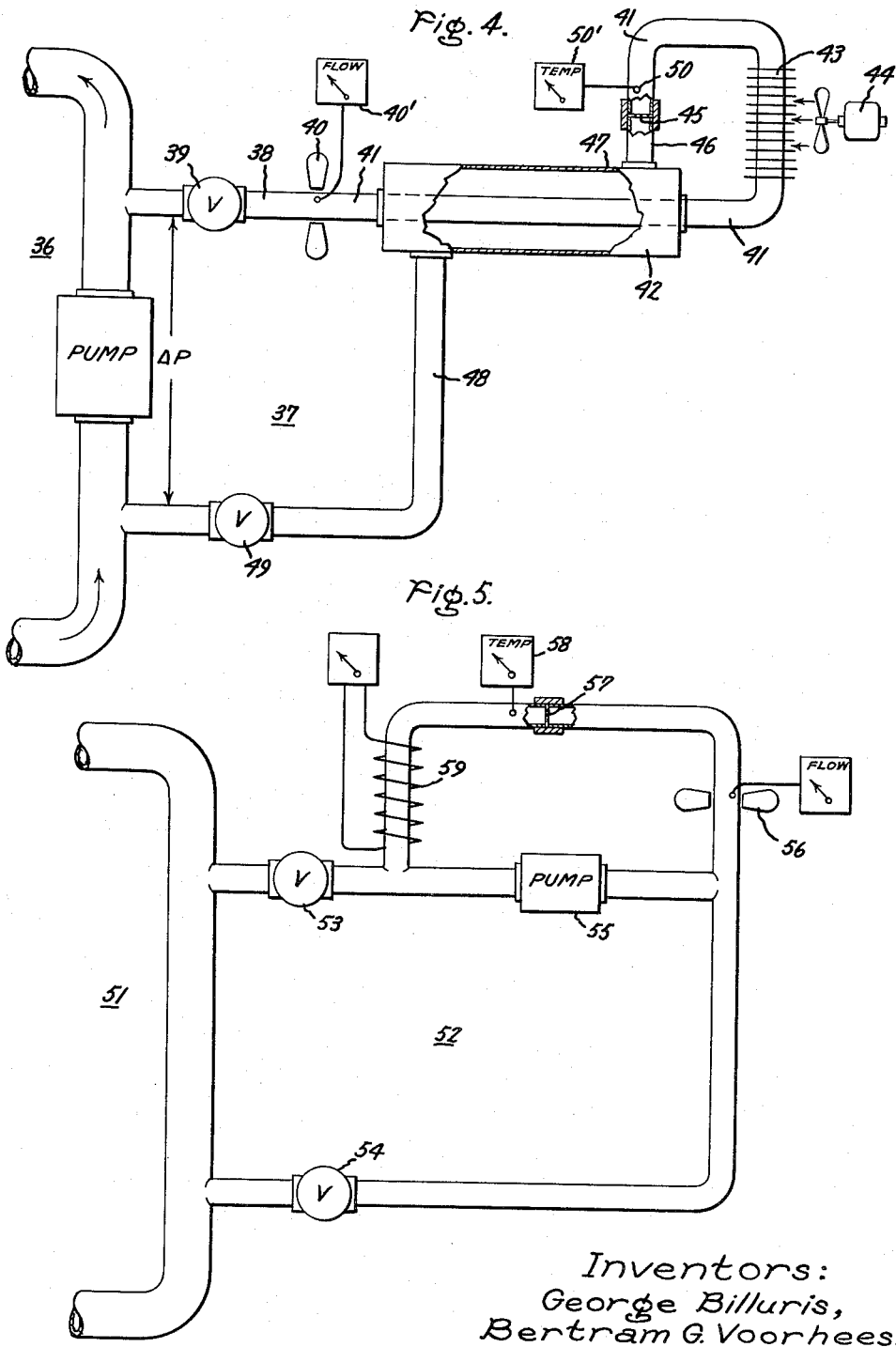

United States Patent Office 2,997,874
Patented Aug. 29, 1961

2,997,874
METHOD AND APPARATUS FOR DETERMINING THE SOLUTE CONTENT OF A SOLUTION
George Billuris, San Jose, Calif., and Bertram G. Voorhees, Schenectady, N.Y., assignors to General Electric Company, a corporation of New York
Filed Mar. 28, 1956, Ser. No. 574,563
4 Claims. (Cl. 73—61)

This invention relates to a method and apparatus for determining the solute content of a liquid solution having a temperature dependent solubility. While this invention can be practiced to detect the solute content of a wide variety of solutions and the apparatus of this invention may take a wide variety of forms, the invention is ideally suited for use in liquid metal systems and, by way of example, is particularly described in this connection.

Liquid metals are ideally suited for use as nuclear reactor coolants. Of particular interest are sodium and sodium-potassium alloys. Commercially available sodium may contain impurities which form solid compounds which do not remain in solution with the sodium when the temperature of liquid sodium is lowered. These solids tend to accumulate in small reactor heat transfer passages and cause plugging of these passages.

Impurities of principal concern in sodium systems are calcium and oxygen which accelerate corrosion and cause system plugging by forming low solubility compounds with sodium. These impurities may not be completely removed by filtering before the sodium is introduced into the system and in a large sodium system, in spite of careful filtering, oxygen contamination is generally encountered. Oxygen contamination may be due to impure cover gas used in the system and to leakage of air whenever the system is opened for maintenance or repairs.

Therefore, it is highly desirable to monitor the oxygen content of the sodium in a liquid metal system and provide for oxygen removal whenever it exceeds a predetermined value so that accumulation of solids in and possible plugging of the reactor, with a resultant costly shutdown, can be avoided.

The impurity content of a liquid metal system may be ascertained by well known analytical methods; however, these methods require the extraction of a sample of the liquid metal from the system. If such a system is opened to take a sample, additional contamination may be introduced and if the system is coupled with a nuclear reactor, the problem of protecting personnel from radiation hazards is introduced.

In accordance with this invention, external handling of samples is not necessary. Continuous monitoring of the condition of liquid in the system is possible, and the impurity content and temperature at which substantial precipitation of solids occurs can be determinde conveniently.

Thus, a principal object of this invention is to provide an improved method and apparatus for determining the solute content and saturation temperature of a liquid solution.

Another object of this invention is to provide an improved method and apparatus for determining the temperature at which solids in a liquid solution will precipitate and cause plugging.

According to an important aspect of this invention, the temperature of a liquid solution is changed. As the liquid solution temperature is changed, solids which were in solution tend to precipitate. These solids are accumulated and the accumulation of precipitated solids is detected.

In the specific embodiments herein described, by way of example, the accumulation of solids is detected by monitoring either the rate of change of the solution temperature, the flow rate of the solution through a flow restriction, the pressure drop across a flow restriction, or any combination of these variables. The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawing in which:

FIGURE 1 illustrates apparatus incorporating the practice of this invention;
FIGURE 1a illustrates a portion of the apparatus shown in FIGURE 1;
FIGURES 2 and 3 illustrate diagrams useful in describing this invention; and
FIGURES 4 and 5 illustrate other embodiments of this invention.

FIGURE 1 illustrates main circulating system 10 and sample system 11. The main circulating system includes pump 12 having inlet 13 and outlet 14. The remaining portion of the main circulating system is not illustrated in order to simplify the description of this invention. For purposes of this description, it may be assumed that a liquid solution, for example, sodium with impurities, is being pumped through the main circulating system in the direction indicated by the arrows.

The sampling system includes pipe 15 with isolating valve 16 which is connected to heat exchanger 17 after passing through flowmeter 18. Flowmeter 18 may be any well known type of flowmeter. For example, a magnetic flowmeter of the type described in an article by A. Kolin, appearing in the Review of Scientific Instruments, volume 16, No. 109 (1945), and in the Liquid Metals Handbook, U.S. Government Printing Office (Navexos P–733), June 1952, is satisfactory for purposes of this invention. Pipe 19 passes through heat exchanger 17 and includes flow restriction 20 therein at the junction between pipes 19 and 21. Pressure differential detector 20' is connected across flow restriction 20 to permit monitoring of the pressure drop to detect the accumulation of solids in the flow restriction. Pipe 21 returns to the main circulating system at the low pressure side of pump 12. Isolating valve 22 is provided in pipe 21 near the connection to the main circulating system. A controllable heater 23 is provided on pipe 21. If the temperature of the solution is cooled sufficiently in the sampling system or the sample is sufficiently large, or both, heater 23 is used to bring the solution temperature up to the temperature of the solution in the main system thereby minimizing thermal shock to the main system.

Heat exchanger 17 includes fins 24 attached to pipe 19. The pipe and fins are enclosed by casing 25 having gas inlet 26, including control valve 26', and gas outlet 27. In the case of this example of a liquid sodium system, the gas may be compressed air for cooling the sodium. The outlet end of pipe 19 is supported by guide ring 28 and leakage of the cooling gas is minimized by bellows assembly 29.

FIGURE 1a illustrates a cross section view of the flow restriction 20. The flow restriction 20 consists of a metal plate with small holes 20' drilled therein. This plate is welded or otherwise suitably secured in pipe 19 at the junction between pipe 19 and pipe 21.

Flowmeter 18 includes an indicator 18'. A temperature measuring device 30, for example, a thermocouple, is connected in the immediate vicinity of flow restriction 20 and includes indicator 31.

Since the sampling system 11 is connected across pump 12, a pressure differential $\Delta p$ exists across the system.

In the practice of this invention, valves 16 and 22 are opened. This permits liquid metal to flow through flowmeter 18 and into heat exchanger 17. Valve 26' is adjusted to provide the proper rate of temperature change of the liquid metal. The liquid metal then passes through the flow restriction 20 and pipe 21 and then returns to the main circulating system. The temperature and rate of flow of the liquid metal are continuously monitored. As the liquid metal is cooled, the saturation temperature for certain solutes or impurities is reached. These impurities tend to precipitate out and collect on flow restriction 20. As these impurities collect, the rate of flow of the liquid metal decreases and the rate of cooling increases. Characteristic curves of changes in flow rate and changes in cooling rate are illustrated in FIGURES 2 and 3.

FIGURE 2 is a plot of solution temperature as a function of time. A marked break in curve 32 occurs when substantial solids collect on the flow restriction 20. That is, the slope of the cooling curve increases at point 33, the plugging temperature. This phenomenon is apparent when it is recognized that as the fluid flow rate through the heat exchanger decreases, the rate of cooling of the fluid increases.

The correspondence between the temperature at which the break point 33 occurs in curve 32 for the sample system or plugging indicator 11 and the temperature at which plugging occurs in the most restricted passages of the main system is established by calibration of the sample system. That is, when the liquid in the main system reaches the plugging temperature, determined from the sample system, solids will be present in the liquid metal system so that fine coolant passages in the main circulating system may be expected to plug. Therefore, the practice of this invention provides a plugging indicator.

FIGURE 3 illustrates a plot of fluid flow as a function of temperature. Curve 34 exhibits a sharp break at point 35 corresponding to the temperature at which substantial plugging of the flow restriction occurs.

Thus, FIGURES 2 and 3 illustrate two practices in accordance with this invention whereby the accumulation of solids and the plugging temperature can be determined. FIGURE 2 illustrates the practice of determinng the plugging temperature as a function of the rate of change of temperature, in this specific example cooling. FIGURE 3 represents an alternative practice of this invention, wherein plugging is detected by a marked decrease in the rate of flow of the solution.

It will be readily apparent to those skilled in the art that the accumulation of solid at the flow restriction can also be detected by measuring the pressure drop across flow restriction 20. Thus, plugging of the flow restriction can be detected by any one or a combination of these three variables.

Therefore, it is apparent that this invention can be practiced to determine the minimum temperature at which a flowing sodium system can be safely operated without plugging of restrictive flow passages by precipitated impurities. It can also be used to determine the oxygen content of the sodium in the system by referring to sodium-oxygen solubility curve with the plugging temperature. By knowing the oxygen content of the system, oxygen can be removed before the content thereof becomes sufficiently high so that plugging will occur at normal operating temperatures.

It will be readily apparent that knowledge of the temperature at which plugging of the flow restriction occurs is of importance in the operation of a sodium cooled reactor due to the serious complications resulting from stoppage of small reactor heat transfer passages.

It will also be apparent that this apparatus is not limited to sodium systems, but can be extended to other liquid metal systems such as sodium-potassium systems in which solubility of solute or impurities in the solution is a function of temperature.

FIGURE 4 illustrates another form of apparatus that may be used in the practice of this invention. This system includes main circulating system 36 and sampling system 37. Sampling system 37 is connected to different points of the main circulating system so that pressure differential $\Delta p$ is maintained across the sampling system. The system includes inlet pipe 38 having isolation valve 39. Inlet pipe 38 is connected to magnetic flowmeter 40 and indicator 40' and the output of flowmeter 40 is connected to pipe 41 which passes through economizer 42.

Pipe 41 is provided with cooling fins 43 which are air cooled. Means providing cooling air are schematically illustrated by electric fan 44. Pipe 41 then continues to flow restriction 45 which is inserted at the junction between pipe 41 and pipe 46. Pipe 46 is connected to the outer jacket 47 of economizer 42. Pipe 48 is connected to jacket 47 and to isolation valve 49 which is coupled to the low pressure side of main circulating system 36. This system is provided with temperature measuring apparatus 50, including indicator 50', located in proximity to flow restriction 45.

As was pointed out in connection with the description of apparatus illustrated in FIGURE 1 of the drawing a heater is sometimes necessary to reheat the liquid metal before reintroduction into the system in order to avoid thermal shock to the system. The use of economizer 42 substantially eliminates the need for a heater and in addition reduces the cooling load on cooler 43, since the cooled liquid metal coming into the economizer through pipe 46 is heated by hot liquid metal from the main circulating system before it is reintroduced into the system. Also, incoming liquid metal is cooled by the outgoing metal thereby reducing the load on the cooler.

The apparatus illustrated in FIGURE 4 provides an indication of the plugging temperature and, therefore, information for determining the saturation temperature and the solute content of the liquid solution, in this example liquid metal, in a manner similar to that described in connection with FIGURE 1.

In a specific example of the apparatus illustrated in FIGURE 4, economizer 42 consists of a three-quarter inch shell, approximately nine inches long, having a one-half inch tube passing therethrough. The cooler consists of one inch tubing formed into a six inch diameter coil of nine turns. The flow restriction consists of a one-eighth inch thick plate inserted in the one inch tubing. The plate is provided with sixteen 0.050 inch diameter holes.

In a typical run, liquid sodium enters the system at 520° F. at a flow rate of approximately 1.3 gallons per minute. The cooling rate is adjusted to approximately 1° to 2° F. per minute. The results of such a typical run are tabulated below. A pronounced change in flow rate was observed between 440° F. and 420° F., thereby indicating plugging between these temperatures.

| Fluid temperature, degrees F.: | Flow rate, gallons minute |
| --- | --- |
| 520° | 1.28 |
| 480° | 1.28 |
| 440° | 1.28 |
| 430° | 1.20 |
| 420° | 1.14 |

By referring to a standard sodium-oxygen solubility curve with this data, it was determined that the oxygen content from this run was approximately 0.005% by weight. The average of four samples, tested by standard analytical methods, indicated an oxygen content of 0.005% by weight.

Thus, it is apparent that the practice of this invention provides a convenient means for determining the percentage of oxygen in solution with the sodium. The practice of this invention also provides a clear indication of the temperature at which substantial precipitation of impurities occurs. It is not necessary to remove and handle sodium from the system as would be necessary if normal analytical methods were used and it is possible to determine the temperature at which plugging of the main system would occur and thereby forestall such plugging by appropriate preventative action.

When it is not convenient to make connection to a circulating system so as to obtain a pressure differential across the flow restriction, apparatus similar to that illustrated in FIGURE 5 may be utilized. This apparatus includes the main circulating system 51 having coupled thereto sampling system 52. The sampling system includes isolating valves 53 and 54. Circulating pump 55 provides substantially constant pressure through flowmeter 56 and across flow restriction 57. Temperature is measured by thermocouple apparatus 58. This system does not utilize a separate cooler. Metal in the system cools as it circulates through the system. In operation, controllable heater 59 supplies sufficient heat so that the flow restriction 57 is at the coolest point in the sample system; however, 59 supplies less heat to the liquid than is lost in the other portions of the system. During the conduct of a run, isolation valves 53 and 54 are closed. Before metal in the sample system can be reintroduced into the main circulating system, it is reheated to the temperature of the main system by heater 59.

The saturation temperature and solute content of the circulating liquid metal is obtained in a manner similar to that already described in connection with the operation of other apparatus incorporating this invention.

In the interest of describing this system with complete clarity, specific reference has been made to liquid metal systems. In addition, the description was limited to a liquid sodium system in which the sodium is cooled in order to cause precipitation of impurities in the sodium and thereby obtain the necessary indications to analyze the composition and characteristics of the sodium solution.

This invention is not limited to these specific examples. The practice of this invention is not limited to a liquid sodium system or, for that matter, to a liquid metal system. Determination of the impurities in any liquid solution can be realized by the practice of this invention. The size of the flow restriction may be used to determine the type of solids that will accumulate and, therefore, this invention can be practiced with any liquid solution in which the solubility of a solute is a function of temperature. Thus, this invention can be used to provide a positive indication of the temperature at which plugging in a liquid solution will occur or alternatively this apparatus can be used as an analytical device for sampling a solution to determine the saturation temperature and solute content thereof.

Other examples of solutions, the solute content of which can be determined by the practice of this invention, include potassium dichromate ($K_2Cr_2O_7$) in water and sodium monoxide ($Na_2O$) in sodium potassium alloy (NaK). This invention is not limited to systems in which the solubility of solute decreases with decreasing temperature. The heat exchanger may be utilized to heat the solution to cause precipitation of solute, the solubility of which decreases with increasing temperature. For example, anhydrous sodium sulphate becomes less soluble in water as the temperature is raised above 40° C. Other examples of solutions in which the solubility of the solute decreases with increasing temperature are aqueous solutions of calcium acetate, calcium chromate, calcium sulphate, or manganese sulphate.

Therefore, it is apparent that this invention provides a method and apparatus for determining the saturation temperature and solute content of a liquid solution having a temperature dependent solubility. Apparatus incorporating the practice of this invention is compact, easy to operate, and has the additional advantage that there is no need to handle solution samples externally, and, when coupled to a main circulating system, there is no possibility, in the practice of this invention, of draining the main circulating system as a result of operator error.

While this invention has been described in connection with a number of specific examples, it will be apparent that this invention can be practiced to analyze a wide variety of materials and can be carried out with a wide variety of apparatus; therefore, it is intended in the following claims to protect all changes and modifications which come within the true spirit and scope of this invention.

What is claimed is:

1. An apparatus for determining the solute content of a solution which comprises a heat exchanger, a solution inlet conduit opening thereinto, a solution outlet conduit opening therefrom, a flow restriction means comprising a plate having small holes therein disposed transversely in said outlet conduit and connected in fluid-receiving relation through said outlet conduit to said heat exchanger whereby the solution flows successively through said exchanger and said flow restriction, temperature sensing means responsive to the temperature of said solution at the point where it flows through said flow restriction, and means for detecting the accumulation at said flow restriction of solids precipitated from the solution in said heat exchanger.

2. An apparatus according to claim 1 wherein said means for detecting solids accumulation comprises, in combination with said temperature sensing means, a means for controlling the flow rate of a heat exchange medium through said exchanger.

3. An apparatus according to claim 1 wherein said means for detecting solids accumulation comprises, in combination with said temperature sensing means, a means for determining the rate of flow of said solution through said flow restriction.

4. An apparatus according to claim 1 wherein said means for detecting the accumulation of solids at said flow restriction comprises means for monitoring the pressure differential across said restriction.

References Cited in the file of this patent

UNITED STATES PATENTS

| | | |
|---|---|---|
| 2,591,084 | Martin | Apr. 1, 1952 |
| 2,635,456 | Barstow | Apr. 21, 1953 |
| 2,643,541 | McCreary | June 30, 1953 |
| 2,750,433 | LeTourneau et al. | June 12, 1956 |
| 2,782,369 | Werner et al. | Feb. 19, 1957 |